United States Patent [19]
Sasaki

[11] Patent Number: 5,220,369
[45] Date of Patent: Jun. 15, 1993

[54] BATTERY COUPLER

[75] Inventor: Hidemi Sasaki, Tokyo, Japan

[73] Assignee: Fuji Photo Film Co., Ltd., Kanagawa, Japan

[21] Appl. No.: 879,213

[22] Filed: May 6, 1992

Related U.S. Application Data

[63] Continuation of Ser. No. 597,222, Oct. 15, 1990, Pat. No. 5,151,727.

[30] Foreign Application Priority Data

Oct. 18, 1989 [JP] Japan ................................ 1-271253
Oct. 27, 1989 [JP] Japan ................................ 1-269860
Dec. 19, 1989 [JP] Japan ................................ 1-328750
Sep. 12, 1990 [JP] Japan ................................ 2-239989

[51] Int. Cl.⁵ ..................... G03B 15/03; H04N 5/225
[52] U.S. Cl. .................................. 354/126; 358/229; 358/906
[58] Field of Search ............ 354/126, 484, 141, 145.1; 358/229, 906

[56] References Cited

U.S. PATENT DOCUMENTS 4,924,246 5/1990 Yamada ............................... 354/126
5,068,683 11/1991 Miyazaki ......................... 358/906 X
5,075,706 12/1991 Miyazaki ............................ 354/126

Primary Examiner—W. B. Perkey
Attorney, Agent, or Firm—Sughrue, Mion, Zinn, Macpeak & Seas

[57] ABSTRACT

A battery coupler for use in VTR integral with a camera. The battery coupler can be mounted to the VTR integral with a camera, allows a battery to be connected thereto, and includes a shoe for mounting accessories. Therefore, if the battery coupler is mounted to the VTR integral with a camera, then a microphone, a video light or the like can be mounted to the VTR integral with a camera.

2 Claims, 15 Drawing Sheets

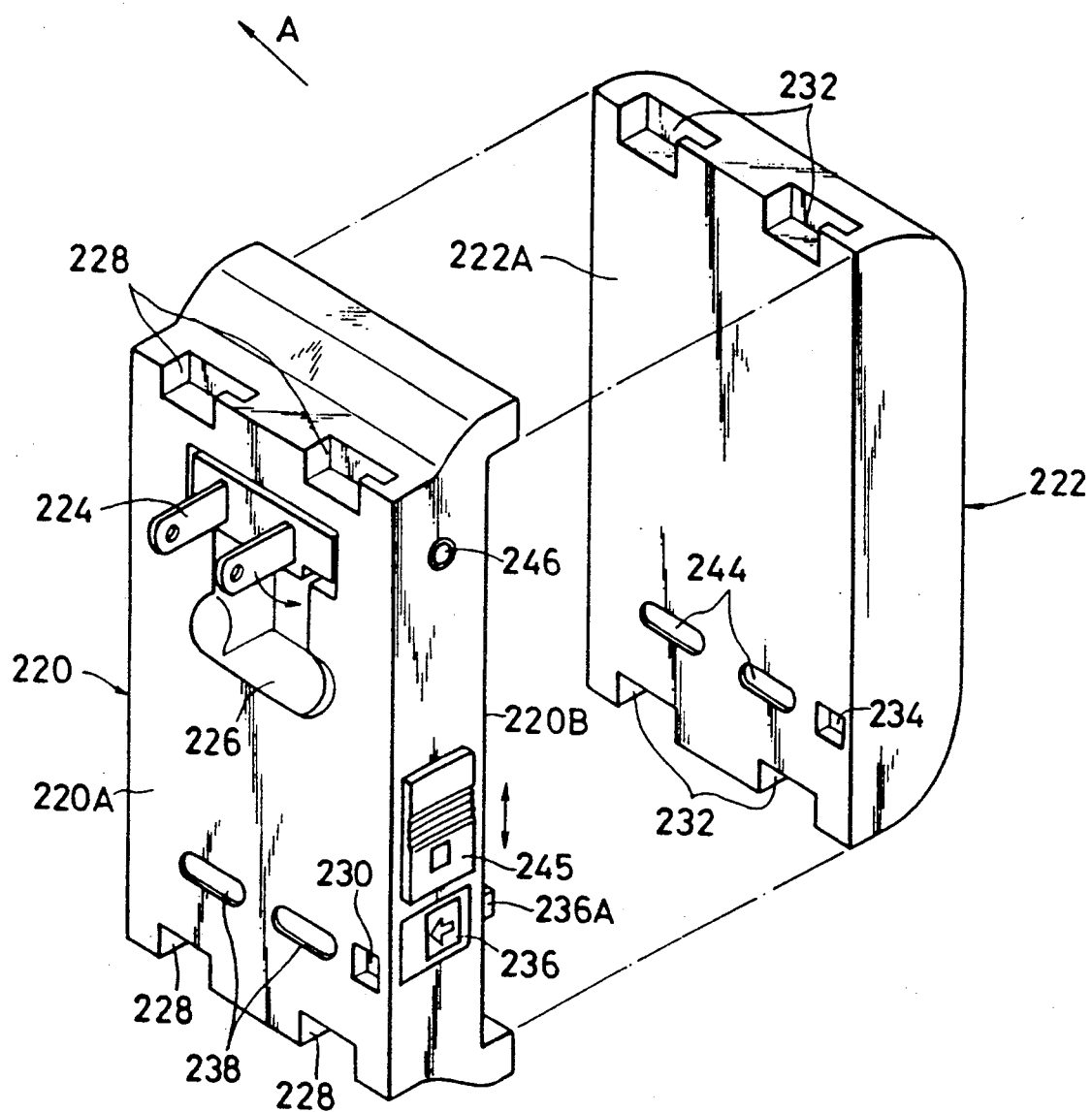

FIG. 14
FIG. 15
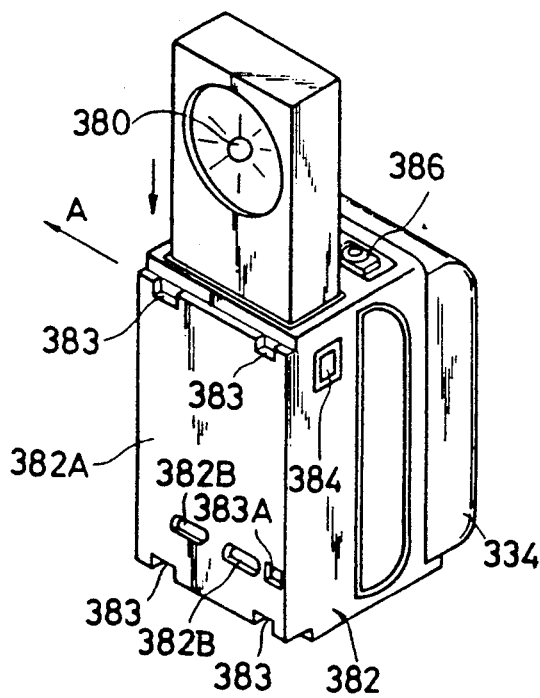
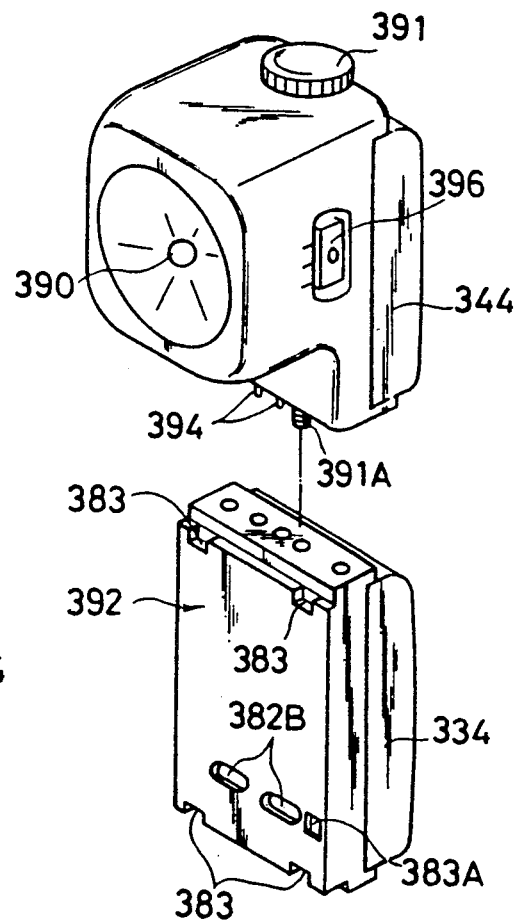

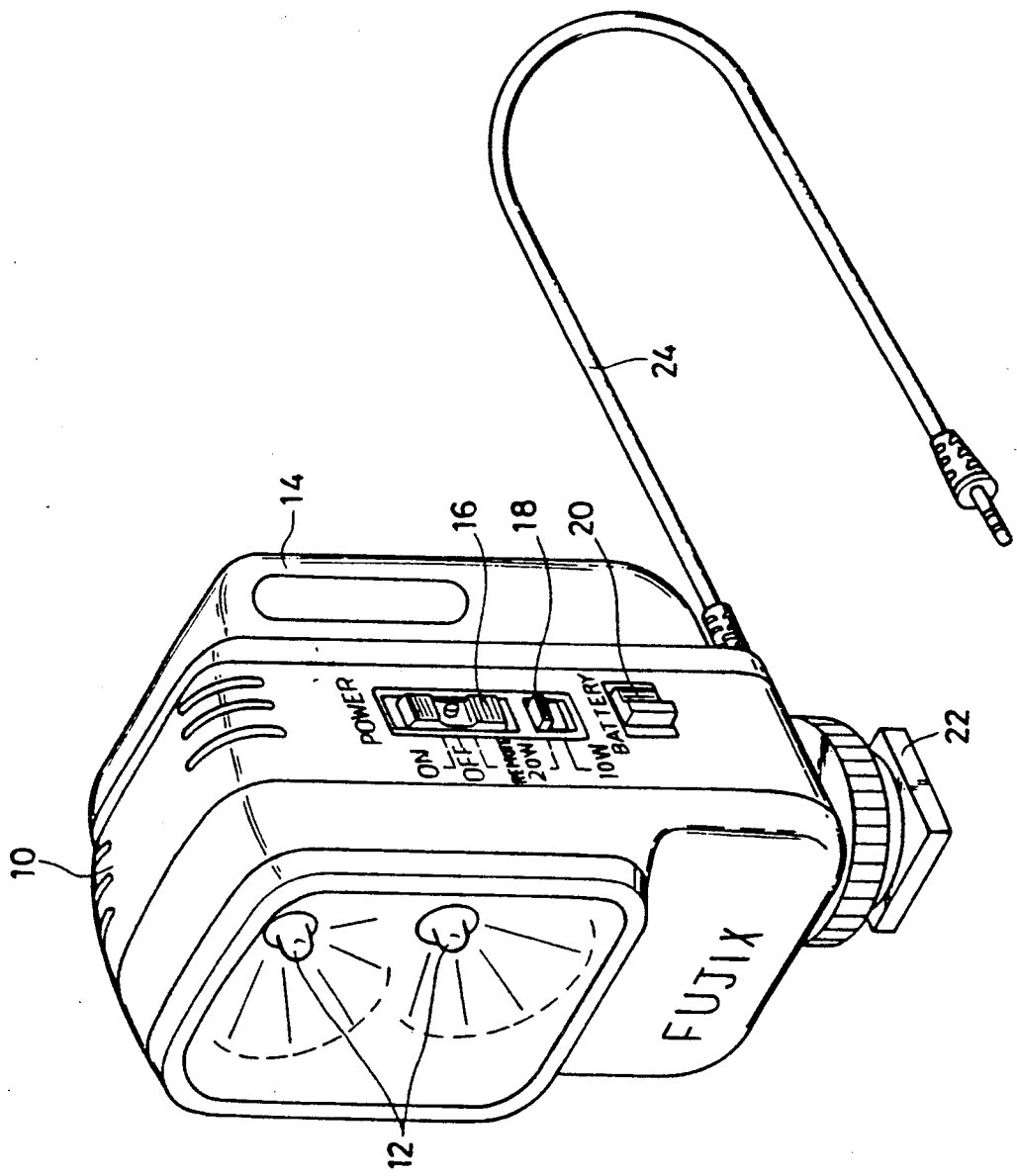

BATTERY COUPLER

This is a continuation of application Ser. No. 07/597,222 filed Oct. 15, 1990, now U.S. Pat. No. 5,151,727.

BACKGROUND OF THE INVENTION

1. Field of the Invention

The present invention relates to a battery coupler and, in particular, to a battery coupler which is used in a video tape recorder (VTR) integral with a camera.

2. Description of the Related Art

① With the spread of a VTR integral with a camera, the use of a battery coupler has been popularized so that, even when taking pictures indoors or in the evening, lack of light can be eliminated to thereby provide a satisfactory picture quality.

Also, there have been increasing photographers who use a microphone having a high performance in order to improve the quality of sound in addition to the picture quality. In use, the battery coupler and the high-performance microphone are mounted onto a shoe for accessory mounting arranged on a camera main body.

② In general, the VTR integral with a camera, an electronic still camera and the like consume a relatively larger amount of electric power. This requires a battery which is capable of supplying a relatively larger amount of electric power. And, in view of running costs, and exclusive, chargeable battery (which is referred hereinafter to as a battery simply) is used in most of cases. This battery can be charged and used successively after it is used (discharged) for a predetermined period of time.

To charge the battery, at first, a plug of battery charger is electrically connected to an AC socket outlet, and then the battery is removed from the camera main body and set to the battery charger. After the battery is set to the battery charger, normally in the lapse of 1 to 2 hours the charging of the battery is completed. Then the battery is disconnected from the battery charger and is mounted to the camera main body again. After then, the plug of the battery charger is removed from the AC socket outlet and the battery charger is then stored. This completes a series of battery charging operations.

③ Further, in the battery coupler discussed above in ① as disclosed in Publication of Laid-open Utility Model Application (Jikkai) No. 61-100078, for example, a video light mounting plate is mounted to a mounting shoe provided on the camera main body and a contact on the video light side disposed in the mounting plate is connected to another contact on the camera main body disposed in the mounting shoe, so that the video light can be turned on by means of a battery provided on the camera main body.

Referring now to FIG. 17, there is shown another conventional battery coupler with battery which comprises 2 halogen lamps 12 disposed in the front portion of a casing 10 and a video light battery 14 disposed in the rear portion of the casing 10. The video light battery 14 and the halogen lamps 12 can be electrically connected or can be brought into electrically engageable connection with each other by operating a mode change-over switch 16 which is provided in the casing 10. Here, numeral 18 designates a switch which is used to change over one mode into another mode or vice versa; in one mode one of the halogen lamps 10 is turned on, and in another mode both of the halogen lamps 10 are turned on. 20 stands for a lock lever for the video light battery 14.

In the bottom portion of the battery coupler constructed in this manner, there is disposed a mounting plate 22, through which plate 22 the battery coupler can be mounted onto a mounting shoe (not shown) disposed in the main body of a VTR integral with a camera.

Also, the battery coupler shown in FIG. 17 further comprises a connecting cord 24. The connecting cord 24 can be connected to a terminal (not shown) of the VTR integral with a camera to thereby receive an electric signal from the VTR integral with a camera, and the thus received electric signal can be used to turn on the halogen lamp(s) 12. For this reason, for example, when the VTR integral with a camera is in its (stand-by) state or in its (REC) state, the halogen lamp 12 is automatically turned on.

However, the above-mentioned prior art battery couplers respectively have problems as follows:

①'s problem:

In recent years, VHS-C type and 8 mm video tape recorders have been conspicuously reduced in size but, however, as a result of the reduction in size, some of such video tape recorders are not provided with a shoe for mounting accessories. For this reason, even if a photographer wishes to obtain an excellent picture quality or an excellent sound, or even if the photographer wishes to enjoy both a moving picture and a still picture as the case may be, a battery coupler, a high-performance microphone, a silver salt camera or the like cannot be mounted to a camera main body.

The present invention is developed in view of the above-mentioned problem found in the ① coupler. Accordingly, it is an object of the invention to provide a battery coupler which allows mounting of a battery coupler, a high-performance microphone, a box-type simple camera or the like even to an 8 mm video tape recorder and the like which does not have a shoe for mounting accessories.

②'s problems:

In order to simplify the above-mentioned series of battery charging operations, the battery may be contained in the camera main body, or the battery charger as well as the battery may be contained in the camera main body. This can save the loading and unloading of the battery and thus the battery charging operations can be simplified.

However, if the battery or the battery charger together with the battery is contained within the camera main body, then in long successive photographing or the like spare batteries cannot be substituted sequentially for such photographing. This means that, with this type of battery coupler, such long successive photographing cannot be realized.

On the other hand, an integral unit consisting of a battery and a battery charger has already been proposed. However, in this case, when a plurality of batteries are used by a photographer, the batteries are costly because each of the batteries is accompanied by a battery charger.

Further, for long-time photographing, it is also possible to use 6 UM-3 batteries after they are stored within the battery case. In this case, however, a photographer must carry the battery case separately from the camera main body and, therefore, the battery case is difficult to carry.

The present invention aims at eliminating the above-mentioned drawbacks found in the prior art. Accordingly, it is another object of the invention to provide a battery coupler which allows simplified battery charging operations, can be applied to long-time photographing in which a plurality of batteries are used sequentially, and eliminates the need to carry a battery case.

③'s problems:

Recently, VHS-C type video tape recorders, 8 mm video tape recorders and the like have been conspicuously reduced in size and, with the reduction in size, the capacity of a battery used in such video tape recorders can be reduced. However, in such video tape recorders, it is not possible to turn on a battery coupler by means of a battery or batteries inserted in a camera main body.

Also, a battery coupler with battery as shown in FIG. 17 weights about 300 g-500 g. When this battery coupler is mounted to a mounting shoe of a compact VTR integral with a camera, then it is disposed in the relatively upper portion of the compact VTR integral with a camera. Due to such position, the battery coupler is unbalanced in weight with the result that images cannot be photographed in a stable manner.

Further, a mounting shoe provided in a recent compact-type video tape recorder integral with a camera is arranged such that only a light part such as an external microphone or the like can be mounted to such mounting shoe. And, there is also available a compact-type video tape recorder integral with a camera which is not equipped with a mounting shoe. In these compact-type video tape recorders there arises a problem that a battery coupler cannot be mounted to them.

In addition, in these video tape recorders there requires the connecting cord 24 in order to control the turning-on of the halogen lamp 12. When carrying the video tape recorder, the connecting cord 24 provides an obstacle, that is, these recorders are lacking in portability.

The present invention aims at eliminating the above-mentioned drawbacks found in the prior art. Accordingly, it is still another object of the invention to provide a battery coupler which has a video light adapted for a compact-type video tape recorder integral with a camera such as an 8 mm video tape recorder and the like.

SUMMARY OF THE INVENTION

In order to achieve the above-mentioned object ①, according to the invention, there is provided a battery coupler which can be mounted to a battery mounting portion of a VTR integral with a camera and allows mounting of a battery for the camera, characterized by a means for electrically connecting the camera battery with the VTR integral with a camera, and a shoe for mounting an accessory.

Also, to attain the above object ②, according to the invention, there is provided a battery coupler which can be mounted to a battery mounting portion of a VTR integral with a camera and allows mounting of a battery for the camera, characterized by a means for electrically connecting the camera battery with the VTR integral with a camera, and a means for charging the camera battery.

Further, in accomplishing the above object ②, according to the invention, there is provided a battery coupler which can be mounted to a battery mounting portion of a VTR integral with a camera and allows mounting of a battery for the camera, characterized by a means for electrically connecting the camera battery with the VTR integral with a camera, a storage portion for storing a spare battery for the camera battery, and a means for electrically connecting the spare battery with the VTR integral with a camera.

Moreover, to achieve the above object ③, according to the invention, there is provided a battery coupler which comprises a video light portion, a battery portion for a video light, a coupler portion mountable to a battery mounting portion of the VTR integral with a camera and allowing mounting of a camera battery thereto for electrically connecting the camera battery with the VTR integral with a camera, characterized in that the video light portion and the video light battery portion can be mounted to the VTR integral with a camera by means of the coupler portion, respectively.

In addition, in order to achieve the above-mentioned object ③, according to the invention, there is provided a battery coupler which comprises a video light portion, a video light battery portion, and a coupler portion mountable to a battery mounting portion of the VTR integral with a camera and allowing mounting of a camera battery thereto for electrically connecting the camera battery with the VTR integral with a camera, characterized in that the video light portion is disposed in a mounting shoe of the VTR integral with a camera, the coupler portion allows mounting of the video light battery portion thereto, and there is provided a control means for control the turn-on of the video light in accordance with the power consumption of the camera battery.

According to the invention, a battery coupler for electrically connecting a VTR integral with a camera with a battery for the camera is interposed between them and, in the battery coupler, there is provided a shoe for mounting accessories, whereby a battery coupler, a high-performance microphone, video light or the like can be mounted to even a VTR integral with a camera which has no shoe for mounting accessories.

Therefore, according to the invention, a photographer is now able to take a picture of an object in a satisfactory and excellent picture quality and also to record sound in an excellent quality.

Also, according to the invention, a battery coupler is mounted to a battery mounting portion of a VTR integral with a camera, a battery for the camera can be mounted to the battery coupler, and the battery coupler includes a means for charging the camera battery. Thanks to this, while the battery coupler and the camera battery are being connected integrally with each other, the camera battery can be charged. Also, in a long-time photographing operation, similarly as in an ordinary VTR integral with a camera, only the charged camera battery can be substituted sequentially.

Further, according to the invention, a battery coupler can be mounted to a battery mounting portion of a VTR integral with a camera, a battery for the camera can be mounted to the battery coupler, and a spare battery can be stored within the battery coupler. Thanks to this, even after the camera battery is discharged out completely, successive photographings can be realized by use of the spare battery.

Still further, according to the invention, a coupler portion for electrically connecting a VTR integral with a camera to a camera battery is interposed between them and in the coupler portion there are provided a video light portion and a video light battery portion are provided, whereby the battery coupler including the video light portion can be mounted to the VTR integral with a camera without using a mounting shoe of the VTR integral with a camera.

In addition, according to the invention, the coupler portion is able to control the turn-on of a video light portion provided in a mounting shoe of a VTR integral with a camera in accordance with the power consumption of the camera battery, thereby eliminating the need of a connecting cord for control.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 4 (B) is a perspective view of a box-type simple camera;

FIG. 6 is a perspective view of a third embodiment of a battery coupler according to the invention;

FIG. 14 is a perspective view of a seventh embodiment of a battery coupler according to the invention;

FIG. 15 is a perspective view of an eighth embodiment of a battery coupler according to the invention;

DETAILED DESCRIPTION OF THE INVENTION

Detailed description will hereunder be given of the preferred embodiments of a battery coupler according to the present invention with reference to the accompanying drawings.

Figure 1:
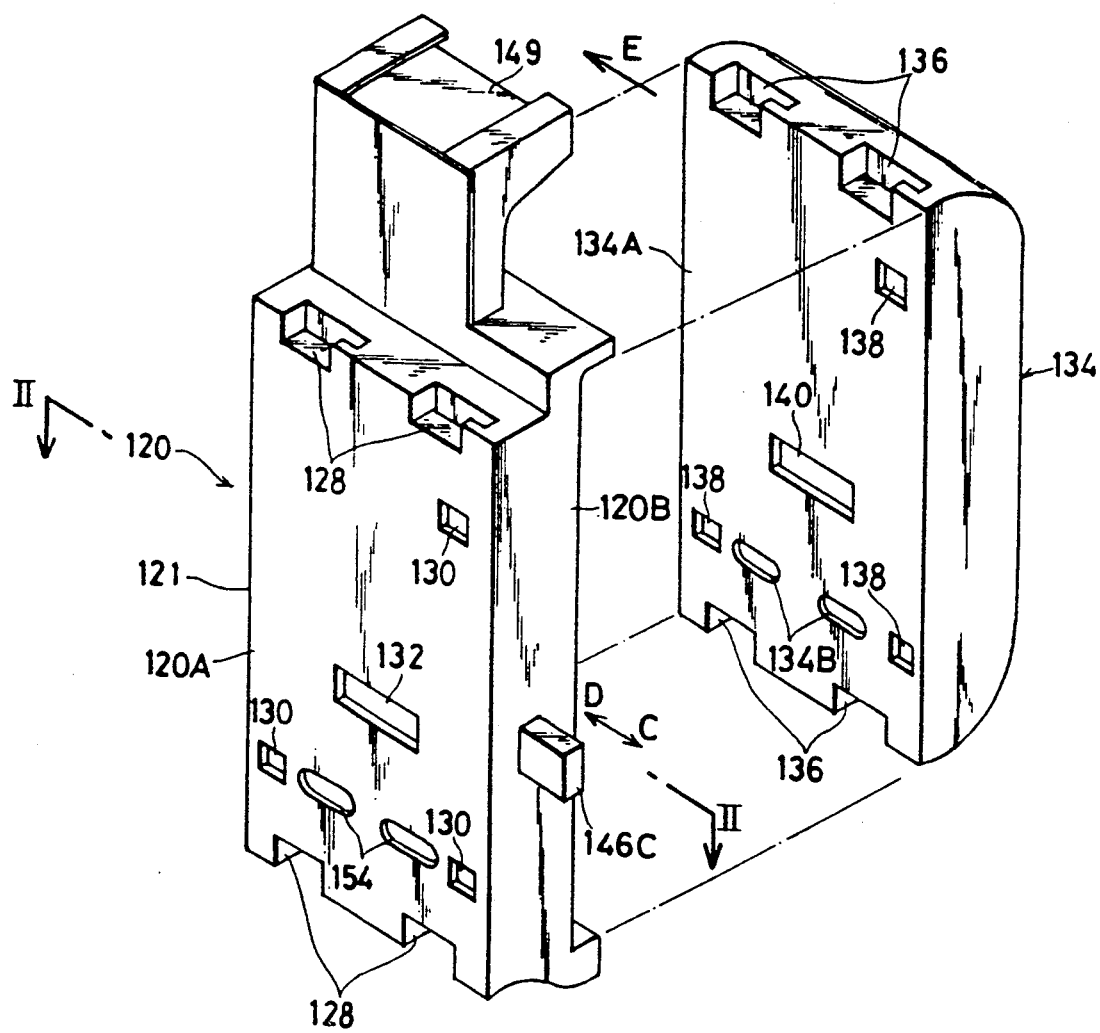
FIG. 1 is a perspective view of a first embodiment of a battery coupler according to the invention.
Figure 2:
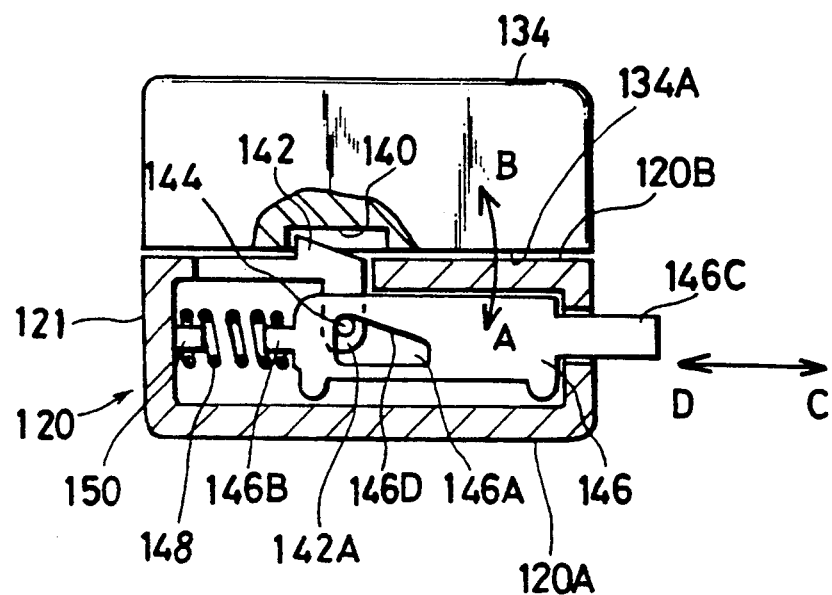
FIG. 2 is a section view taken along the line II—II in FIG. 1.

Referring to FIG. 1, there is shown a perspective view of a first embodiment of a battery coupler according to the invention. In FIG. 2, there is shown a section view of a battery coupler taken along the line II—II in FIG. 1. As shown in FIG. 1, a battery coupler 120 has a front surface 120A and in the front surface 120A there are formed engagement holes 128, 128, . . . , lock holes 130, 130, 130, and lock hole 132. The engagement holes 128, 128, . . . , lock holes 130, 130, 130, and lock hole 132 are formed in the same positions and in the same shapes with engagement holes 136, 136, . . . , lock holes 138, 138, 138, and a lock hole 140 respectively formed in a battery 134, respectively.

Also, in the battery coupler 120, as shown in FIG. 2, there is formed an engagement claw 142 which is used to lock the battery 134. The engagement claw 142 is arranged such that it can be elastically deformed in a direction of an arrow A - B in FIG. 2. The engagement claw 142 further includes a projection portion 142A in which a pin 144 is provided. The pin 144 is stored within an opening 146A formed in a moving body 146 which is slidably arranged in a case for the battery coupler 120.

The above-mentioned moving body 146 includes a projection 146B with which one end of a coil-shaped spring 148 is engaged. Also, the other end of the spring 148 is engaged with a projection 150 formed in the case 121 for the battery coupler 120. Due to this, the moving body 146 is being energized in a direction of an arrow C by the spring 148.

In the moving body 146 there is provided a projection portion 146C which projects out of a main body 121 of the battery coupler 120. If the projection portion 146C is pressed to thereby move the moving body 146 in a direction of the arrow D against the energizing force of the spring 148, then the pin 144 is pressed by an inclined surface 146D forming the above-mentioned opening 146A and is thereby moved in the arrow A direction, with the result that the engagement claw 142 is similarly bent in the arrow A direction. Thus, the engagement claw 142 is caused to retreat from the lock hole 140, so that the battery 134 can be removed from the battery coupler 120.

Further, in the battery coupler 120 there is provided a shoe 149 for mounting accessories, as shown in FIG. 1. The accessory mounting shoe 149 is arranged such that a battery coupler, a high-performance microphone, a remotely controllable light receiving unit or the like can be mounted to the shoe 149.

Next, description will be given below of the operation of a battery coupler according to the invention constructed in the above-mentioned manner.

Figure 3:
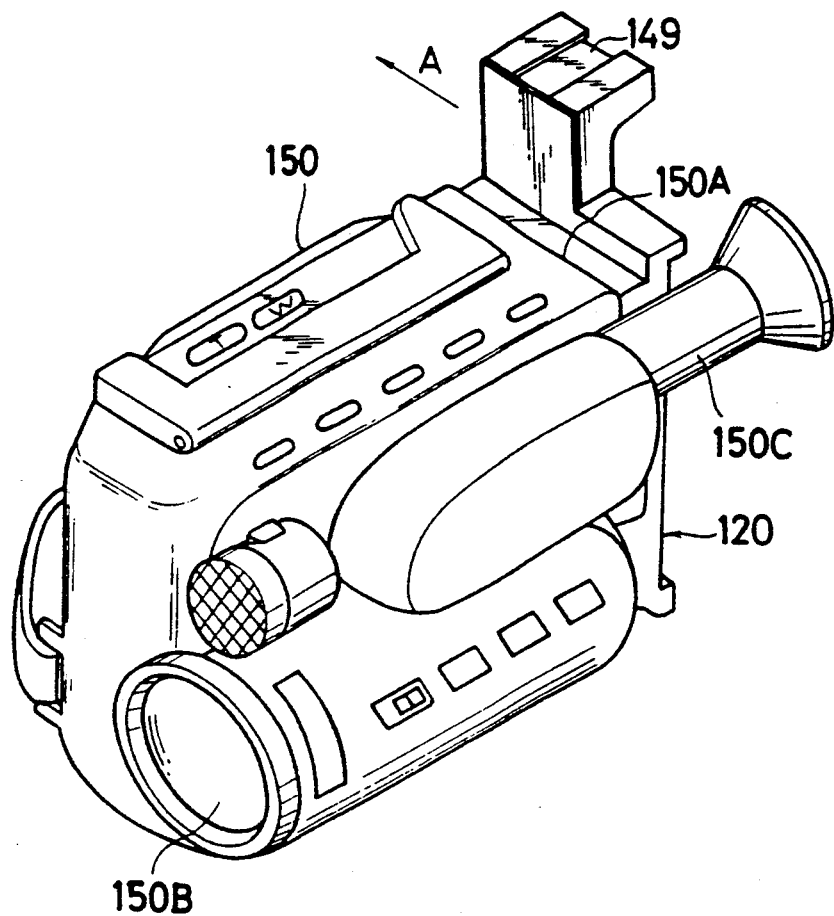
FIG. 3 is a perspective view of a battery coupler according to the invention mounted to a conventional VTR integral with a camera.

At first, if, while is being pressed against the battery mounting portion 150A of a camera main body 150, the battery coupler 120 is moved in a direction an arrow A in FIG. 3, then an engagement member (not shown) formed in the camera main body 150 is brought into engagement with the engagement holes 128, 128 . . . of the battery coupler 120. In this position, a battery release switch (not shown) provided on the side of the camera main body 150 is held at its lock position by means of the energization force of a spring, so that a lock member (not shown) of the camera main body 150 is inserted into the lock hole 130 and thus the battery coupler 120 is fixed to the camera main body 150.

In this fixation, the terminals 154, 154 of the battery coupler 120 shown in FIG. 1 are brought into connection with the terminals (not shown) of the camera main body 150. By the way, in FIG. 3, reference character 150B designates a taking lens, and 150C designates an electronic view finder.

Next, when mounting the battery 134 to the battery coupler 120, similarly when the battery coupler 120 is mounted to the camera main body 150, the mounting surface 134A of the battery 134 is pressed against the mounting surface 120B of the battery coupler 120. As a result of this, the mounting surface 134A of the battery 134 is pressed against the engagement claw 142 shown in FIG. 2 to thereby bend the engagement claw 142 in the arrow A direction in FIG. 2.

Then, if the battery 134 is moved in a direction of an arrow E in FIG. 1, the engagement holes 136, 136, ... of the battery are brought into engagement with an engagement member (not shown) (which is the same as the above-mentioned engagement member of the camera main body 15) provided in the battery coupler 120 and, at the same time, the bent engagement claw 142 is released from the pressing force applied by the mounting surface 134A so that the claw 142 returns in the arrow B direction and gets into the lock hole 140. In this manner the battery 134 is fixed to the battery coupler 120 and the terminals 134B, 134B of the battery 134 are brought into connection with the terminals (not shown) of the battery coupler 120.

Thanks to this, the accessory mounting shoe 149 of the battery coupler 120 can be mounted to the camera main body 150, so that a battery coupler, a high-performance microphone, a remote-control light receiving unit or the like can be mounted to the VTR integral with a camera by means of the accessory mounting shoe 149.

Next, when disconnecting the battery 134 from the battery coupler 120, if the projection portion 146C of the moving body 146 is pressed to thereby slide the moving body 146 in the arrow D direction against the energization force of the spring 148, then the pin 144 is moved along the inclined surface 146D, with the result that the engagement claw 142 is bent in the arrow D direction and is thus retreated from the lock hole 146. In this condition, if the battery 134 is moved in the arrow A direction in FIG. 3, then engagement member (not shown) of the battery coupler in engagement with the lock holes 136, 136, ... is released from the engagement so that the battery 134 can be removed.

Although in the above-mentioned first embodiment the battery coupler 120 is provided with the accessory mounting shoe 149 having no electric contact, the present invention is not always limited to this, but an accessory mounting shoe having an electric contact may also be provided.

Figure 4A:
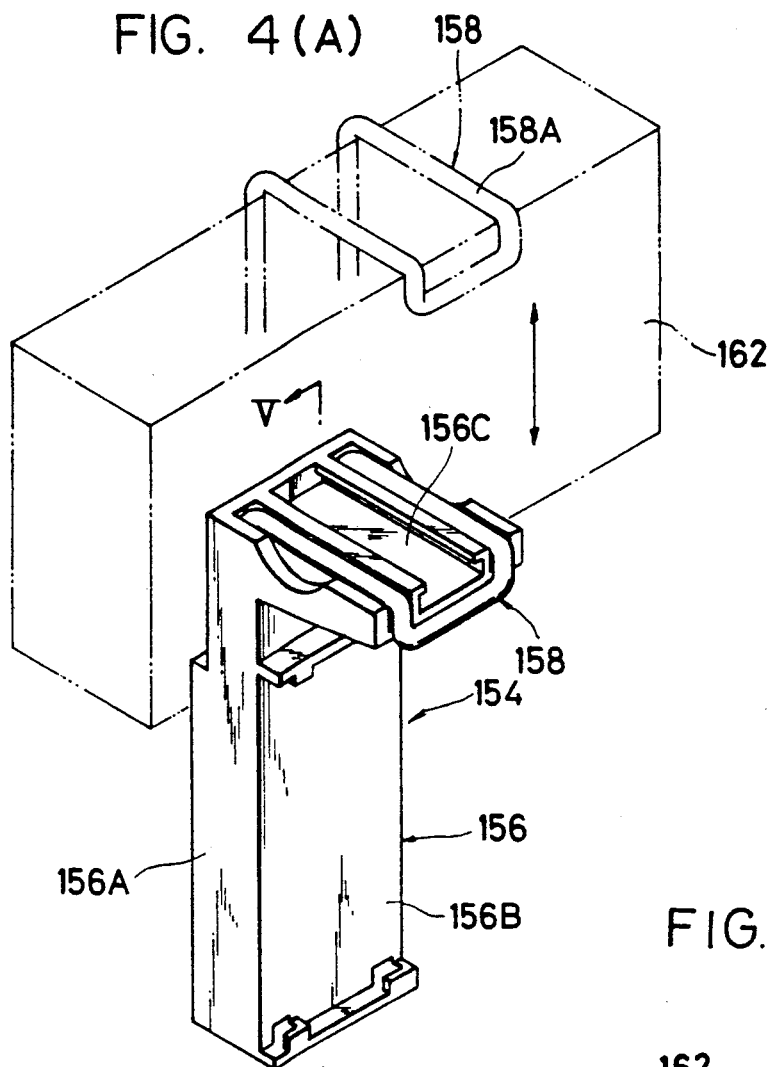
FIG. 4 (A) is a perspective view of a second embodiment of a battery coupler according to the invention.
Figure 4B:
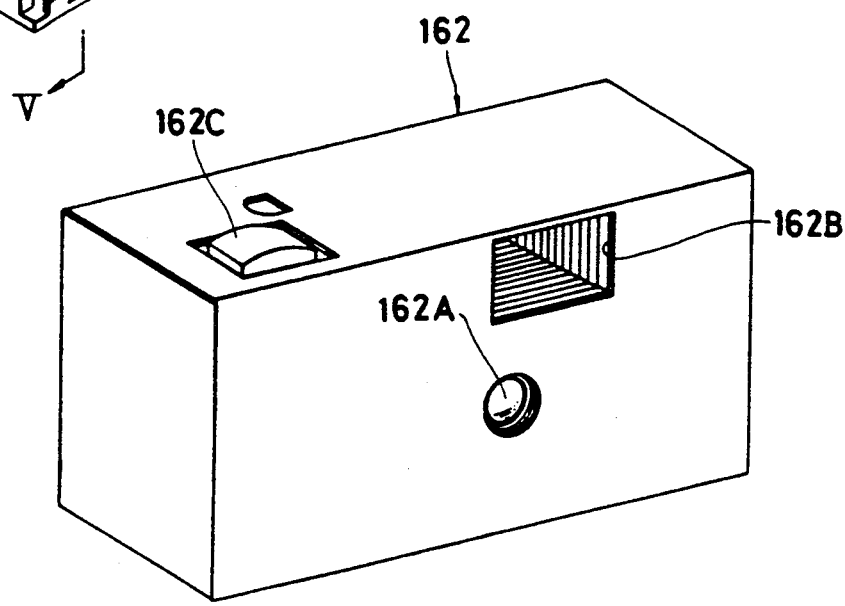

Referring not to FIGS. 4 (A), 4(B) and 5, there is shown a second embodiment of a battery coupler according to the invention, including a camera mounting means. In these figures, a battery coupler 154 has a coupler main body 156 which is constructed substantially in the same shape with the above-mentioned battery coupler 120. For this reason, similarly as in the battery coupler 120, the coupler main body 156 allows its video camera mounting surface 156A to be mounted to a video camera 150 and also the battery 134 can be mounted to the battery mounting surface 156B of the coupler main body 156. Further, an accessory mounting shoe 156C is provided in the upper end of the coupler main body 156.

Figure 5:
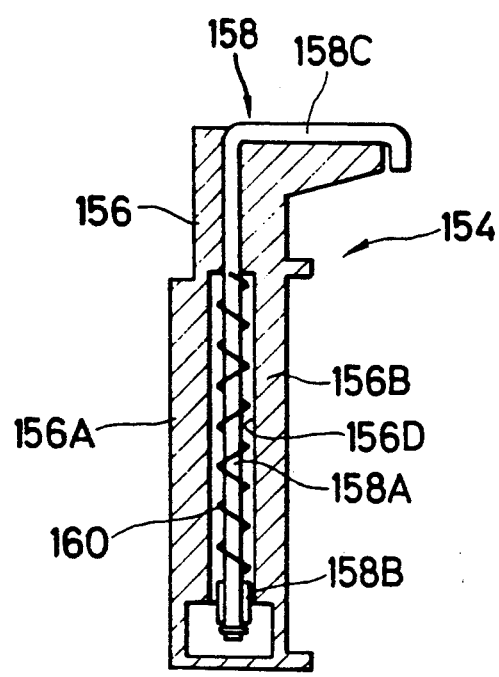
FIG. 5 is a section view taken along the line v—v in FIG. 4 (A)

The coupler main body 156 is different from the battery coupler 120 of the first embodiment in that in the coupler main body 156 there is formed an opening 156D (see FIG. 5) for storing a pressure member 158 which will be discussed later. The pressure member 158 is provided in the opening 156D in such a manner that it can be freely slided. The pressure member 158 is formed of a wire rod (for example, a piano wire) by bending the same. The pressure member 158 includes leg portions 158A, 158A, an extended portion 158B provided in the lower end of the leg portion 158A, and a pressure portion 158C extending from the upper ends of the leg portions 158A, 158A in a direction intersecting the leg portions 158A, 158A.

On the leg portions 158A, 158A there are provided coil-shaped compression springs 160, 160, respectively. The lower end of the compression spring 160 is in touch with the extension portion 158B of the leg portion 158A while the upper end thereof is in touch with the coupler main body 156. Due to this, the pressure member 158 is moved in a downward direction in FIG. 2 by means of the energization force of the springs 160, 160, so that the pressure portion 158C of the pressure member 158 is brought into contact with the shoe 156C of the coupler main body 156. As a result of this, the pressure member 158 is stored within the coupler main body 156. Thus, accessories or the like can be mounted to the shoe 156C.

If the pressure member 156 is lifted upward against the energization force of the compression springs 160, 160, a box-type simple camera 162 or the like is placed on the receiving portion 156D of the pressure member 156, and the pressure member 156 is then released, then the pressure member 158 is moved downward due to the energization forces of the compression springs 160, 160. Therefore, the box-type simple camera 162, as shown in FIG. 4 (A), is held between the pressure portion 158D and the shoe 156D and is then mounted to the coupler main body 156. By means of this, the box-type simple camera 162 can be mounted to the video camera 150 via the coupler main body 156.

The box-type simple camera 162 is a low-price camera which has minimum functions required for a camera. This box-type simple camera 162 is formed in a cube, as shown in FIG. 4 (B) and includes, as a minimum function of a camera, a taking lens 162A, a finder 162B, a shutter-release button 162C and the like. Although in the second embodiment the battery coupler 154 with the shoe 156C has been described, a battery coupler with no shoe can also be used. In this case, in the battery there is provided a receiving part which is similar in shape to the shoe 156C, so that the receiving part and the pressure portion 158A can be used to hold the box-type simple camera 162 between them.

In the second embodiment, discliption has been given of a case when the box-type simple camera 162 is mounted. However, this in not remitative but other box-type accessories, for example, a cord storage box, cssettes strage box, a battery strage box and the like, can also be mounted.

Next, description will be given below in detail of a battery coupler shown in FIGS. 6 to 10.

In FIG. 6, there is shown a perspective view of a third embodiment of a battery coupler according to the invention. A battery coupler 220 has engagement holes 228, 228 ... and a lock hole 230 formed in the front surface 220A thereof. The engagement holes 228, 228 ... and lock hole 230 are formed at the same positions and in the same shapes with engagement holes 232, 232 ... and a lock hole 234 formed in a battery 222, respectively.

Figure 10:
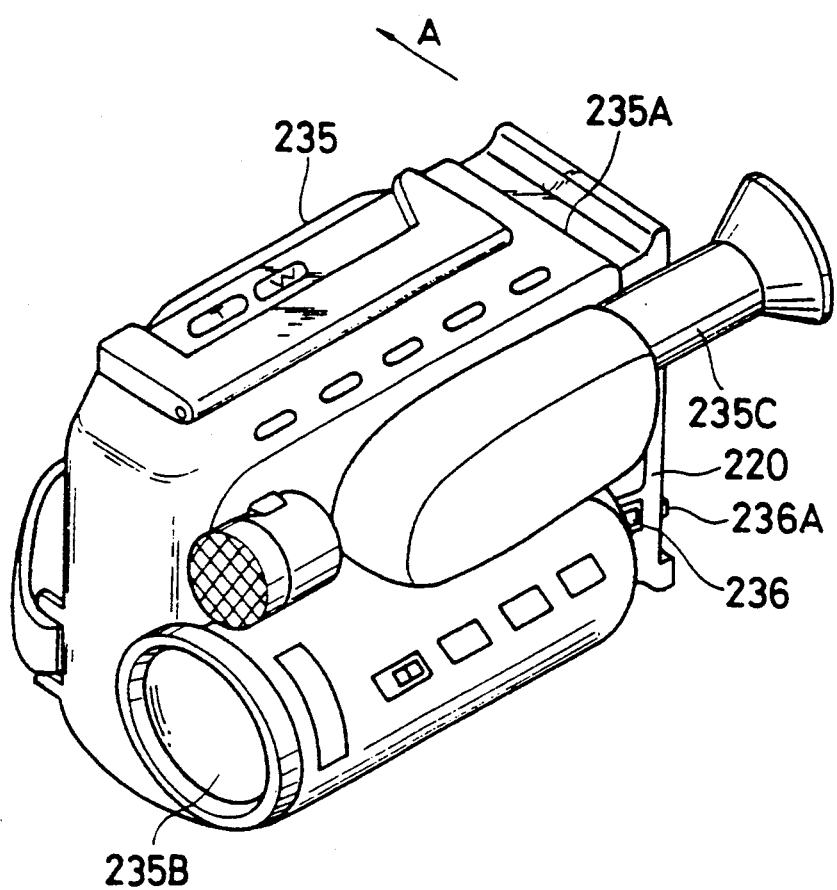
FIG. 10 is a perspective view of a battery coupler according to the invention mounted an 8 mm video tape recorder.

Thus, if, while being pressed against a battery mounting portion 235A of a camera main body 235 shown in FIG. 10, the battery coupler 220 is moved in a direction of an arrow A in FIG. 10, then an engagement member (not shown) provided in the camera main body 235 is brought into engagement with the engagement holes 228, 228 . . . . Since, in this position, a battery release switch (which is the same member with a battery release switch to be described later) is held at its lock position by means of the energization force of a spring (not shown), a lock member (which is the same member with a lock member 236A to be described later) is inserted into the lock hole 230 so that the battery coupler 220 is fixed to the camera main body 235. In this fixation, the terminals 238, 238 of a battery charger are connected with the terminals of the camera main body 235, respectively. By the way, in FIG. 10, reference character 235B designates a taking lens and 235C stands for an electronic view finder (EVF).

When mounting the battery 222 to the battery coupler 220, similarly when the battery coupler 220 is mounted to the camera main body 235, if, while being pressed against the mounting surface 220B of the battery coupler 220, the mounting surface 222A of the battery 222 is moved in the arrow A direction, then an engagement member (not shown) provided in the battery coupler 220 is brought into engagement with the engagement holes 232, 232 . . . in the battery 222. Since in this position the battery release switch 236 is held at its lock position by means of the energization force of a spring (not shown), the lock member 236A is brought into engagement with the hole 234 in the battery 222 so that the battery 222 can be mounted to the battery coupler 220.

Also, in the front surface 220A of the battery coupler 220 there is provided a plug socket 224 such that it is freely rotatable. If the plug socket 224 is rotated in a downward direction, then it can be stored within a recessed portion 226 formed in the front surface of the battery coupler 220.

Figure 7:
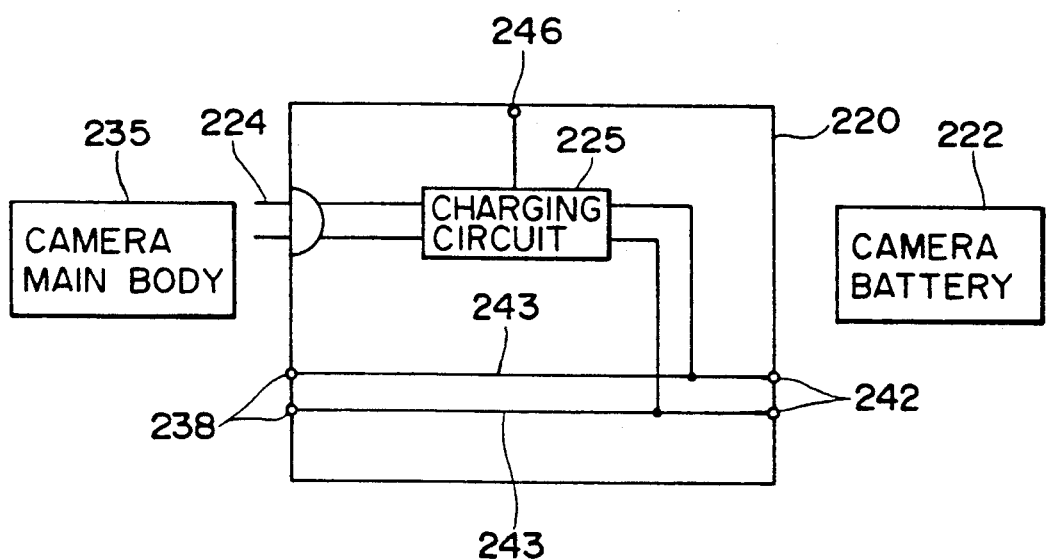
FIG. 7 is an electric circuit diagram employed in the third embodiment of a battery coupler according to the invention.
Figure 8:
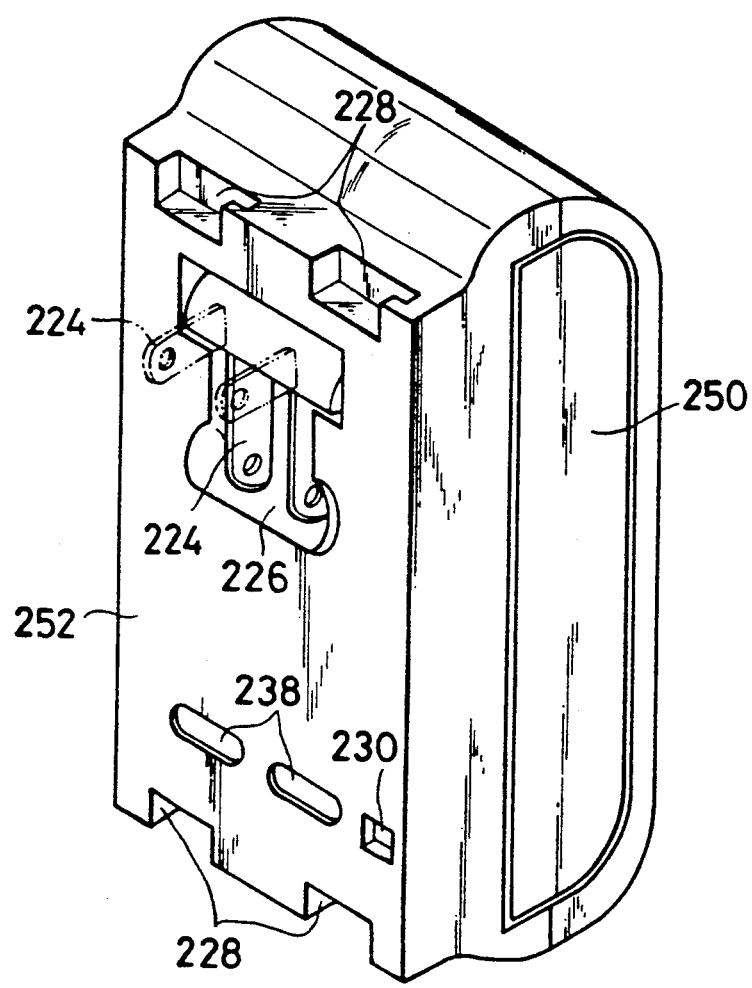
FIG. 8 is a perspective view of a fourth embodiment of a battery coupler according to the invention.

In FIG. 7, there is shown an electric circuit of the battery coupler 220. The terminals 238, 238 are brought into connection with the terminals provided on the side of the camera main body 235, respectively when the battery coupler 220 is mounted to the camera main body 235. The terminals 242, 242 of the battery coupler 220 are brought into connection with the terminals 244, 244 (see FIG. 6) of the battery 222, respectively, when the battery 222 is mounted to the battery coupler 220. The terminals 238, 238 are electrically connected with the terminals 242, 242 by means of cables 243, 243, respectively. For this reason, the battery 222 is electrically connected with the camera main body 235.

The battery couple 220 is removed from the camera main body 235 and the plug socket 224 is then rotated upwardly into a state shown in FIG. 6. In this state, if the plug socket 224 is connected with an AC socket, then the battery 222 can be charged via charging circuit 225. In this charging, a lamp 246 turns on. By the way, in FIG. 6, a slide cover 245 covers the battery release switch 236 to thereby prevent the mis-operation of the battery release switch 236.

As illustrated above, in the third embodiment of a battery coupler according to the invention, the battery 222 is mounted to the rear portion of the battery coupler 220. However, the invention is not always limited to this, but, as shown in a fourth embodiment of the invention in FIG. 8, a battery 250 may be stored within a battery coupler 252. By storing the battery 250 within the battery coupler 252, the battery 250 and battery coupler 250 can be more integral with each other than in the third embodiment. By the way, the same parts in FIG. 8 with those in FIG. 6 are given the same designations respectively and the description thereof is omitted here.

Figure 9:
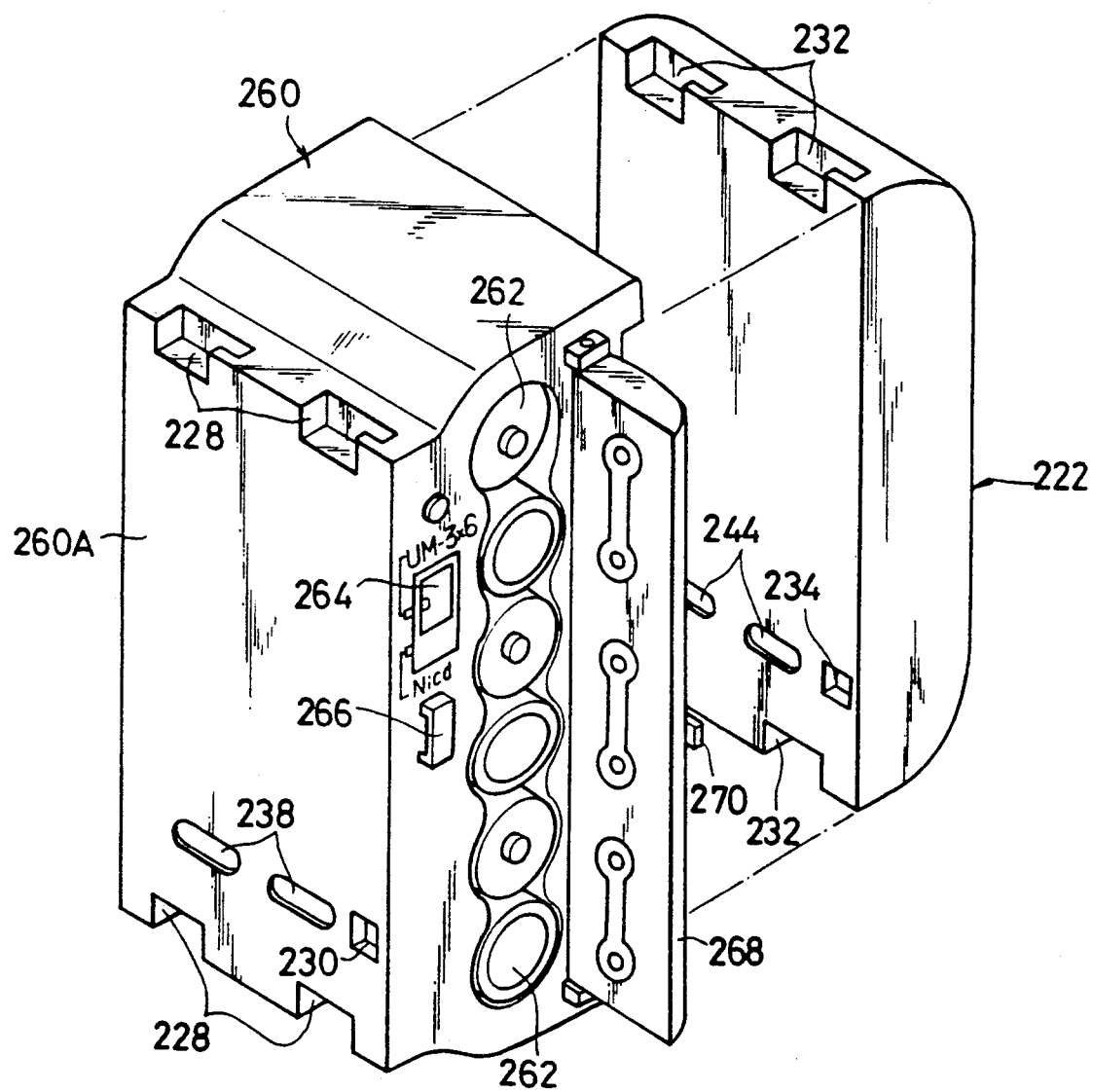
FIG. 9 is a perspective view of a fifth embodiment of a battery coupler according to the invention.

Referring now to FIG. 9, there is shown a fifth embodiment of a battery coupler according to the invention. In the fifth embodiment, 6 UM-3 batteries are stored in the battery coupler 260. The battery coupler 260 has a front surface 260A in which there are formed the same engagement holes 228, 228, . . . and lock hole 230 as in the previously-mentioned fourth embodiment of the invention, and further there are provided terminals 238, 238 to be connected with the terminals of the camera main body shown in FIG. 10.

Also, in the battery coupler 260, there are provided two wires, which are the same as in the previously described third and forth embodiments, for electrically connecting the terminal 238 with the terminal 242 (see FIG. 7). Thanks to this, if the battery coupler 260 is mounted to the camera main body 235 and the camera battery 222 is mounted to the battery coupler, then the terminals 244, 244 of the battery 222 can be electrically connected with the terminals of an electric circuit employed in the camera main body 235. In this state, if a mode change-over switch 264 is set at its (Nicd) position, then the camera battery 222 can be used to operate the camera main body 235. When the capacity of the camera battery 222 becomes empty, if the mode change-over switch 264 provided in the battery coupler 260 is at its (UM-3×6) position, then the UM-3 batteries 262, 262, . . . are electrically connected with the terminals of the camera main body 235. As a result of this, the camera main body 235 can be operated continuously.

As described above, in the fifth embodiment, 6 UM-3 batteries 262 are stored in the battery coupler 260. However, the present invention is not always limited to this, but other type of the batteries such as an exclusive battery which can be recharged may be stored. By the way, in FIG. 9, reference numeral 266 designates a fixing member which is used to fix a projection 270 of a cover 268 rotatably provided in the battery coupler 260.

Next, description will be given in detail of other embodiments of a battery coupler according to the invention, which are respectively shown in FIGS. 11 to 16.

Figure 11:
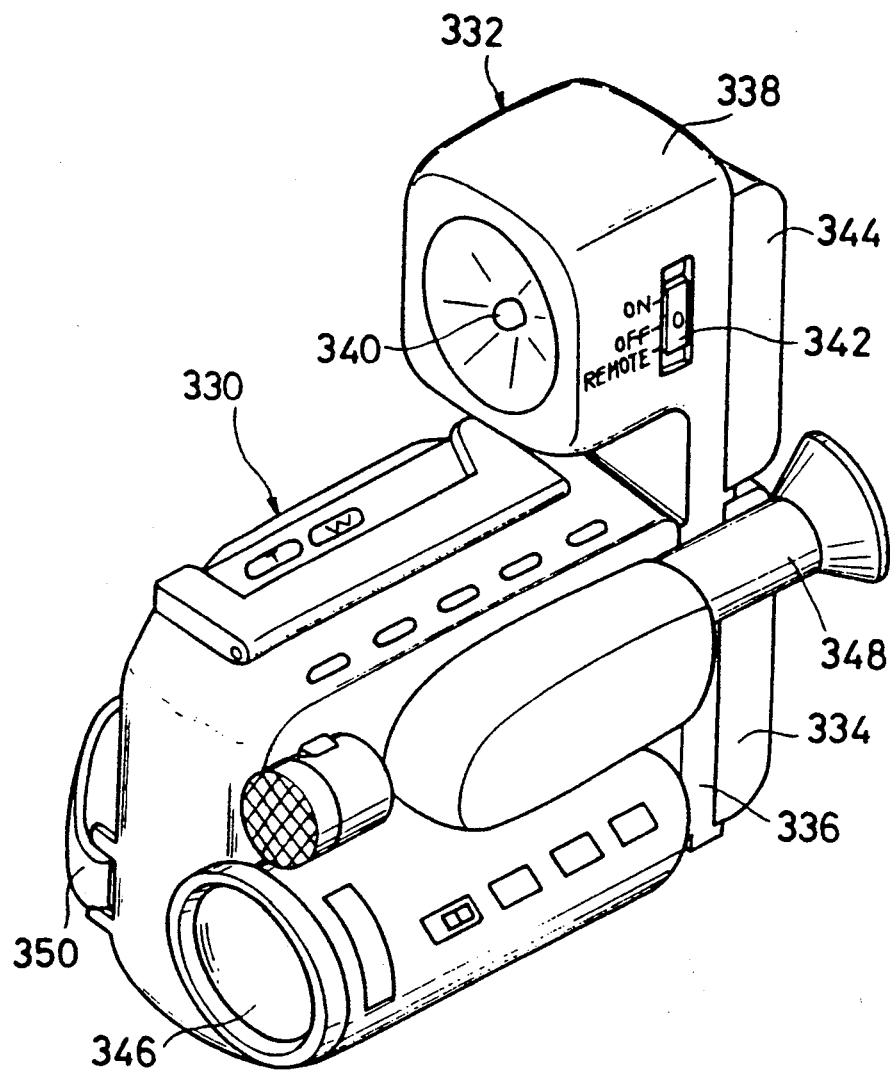
FIG. 11 is a perspective view of a sixth embodiment of a battery coupler according to the invention, when it is mounted to an 8 mm VTR.

In FIG. 11, there is shown a camera main body 330 of a small-size 8 mm video tape recorder and a sixth embodiment of a battery coupler according to the invention mounted to the camera main body 330. The camera main body 330 has a rear portion which is constructed such that a battery 344 for operating the camera main body 330 can be mounted thereto and also can be electrically connected to an electric circuit employed in the camera main body 330. A coupler 336 of a battery coupler 332 is mounted to the thus constructed rear portion of the camera main body 330. For this reason, the mounting portion of the coupler 336 to the camera main body 330 has the same structure as the mounting portion of the battery 334, and the rear portion of the coupler 336 is contructed in the same manner with the rear portion of the camera main body so that the battery 334 can be mounted to the rear portion of the coupler 336.

The above-mentioned coupler 336 is constructed intergrally with a light case 338 within which there is arranged a halogen lamp 340. Also, in the light case 338, there is provided a mode change-over switch 342 and, further, a battery 344 for a video light is removably mounted to the rear portion of the light case 338. Therefore, the battery coupler 332 forms a video light unit.

By the way, in FIG. 11, 346 designates a taking lens, 348 stands for an electronic view finder (EVF), and 350 designates a grip band.

Figure 12:
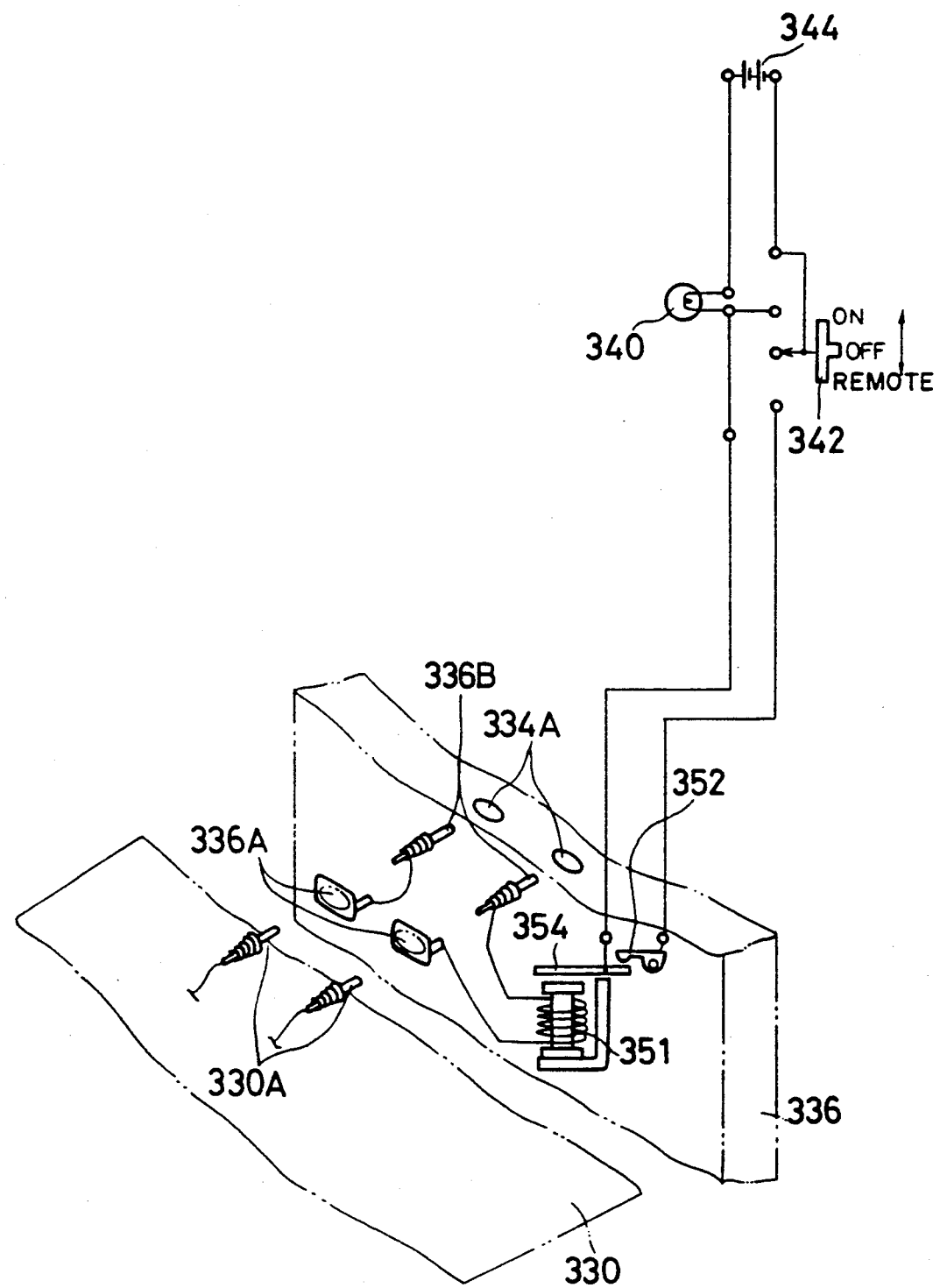
FIG. 12 is an electric circuit diagram employed in the sixth embodiment of a battery coupler according to the invention.

Now, in FIG. 12, there is shown an electric circuit employed in the sixth embodiment of a battery coupler according to the invention, which is shown in FIG. 11. If the battery coupler 332 is mounted between the camera main body 330 and the battery 344, as shown in FIG. 11, then the terminals 330A, 330A of the camera main body 330 are connected to the terminals 336A, 336A of the battery coupler 332, and the terminals 336B, 336B of the battery coupler 332 are connected to the terminals 334A, 334A of the battery 334. The battery coupler can be switched between two modes by means of operation of the mode change-over switch 342: that is, in one mode, it normally turns on the halogen lamp 340, and, in the other mode, it detects the current of the camera main body 330 to thereby turn on the halogen lamp 340 automatically in photographing.

In other words, if the change-over switch 342 is set at the (ON) position in FIG. 12, then the battery 344 for a video light and the halogen lamp 340 are put into a closed circuit to thereby turn on the halogen lamp 340. Also, the mode change-over switch 342 is set at its (remote) position to thereby put the camera main body 330 into its (REC) condition, then a coil 351 is caused to electrically conduct so that a switch 352 can be brought into contact with a plate 354. In this manner, when a relay switch means consisting of the coil 351, switch 352 and plate 354 is put to operation, then the voltage of the video light battery 344 is applied to the halogen lamp 340 to thereby automatically turn on the halogen lamp 340.

Figure 13:
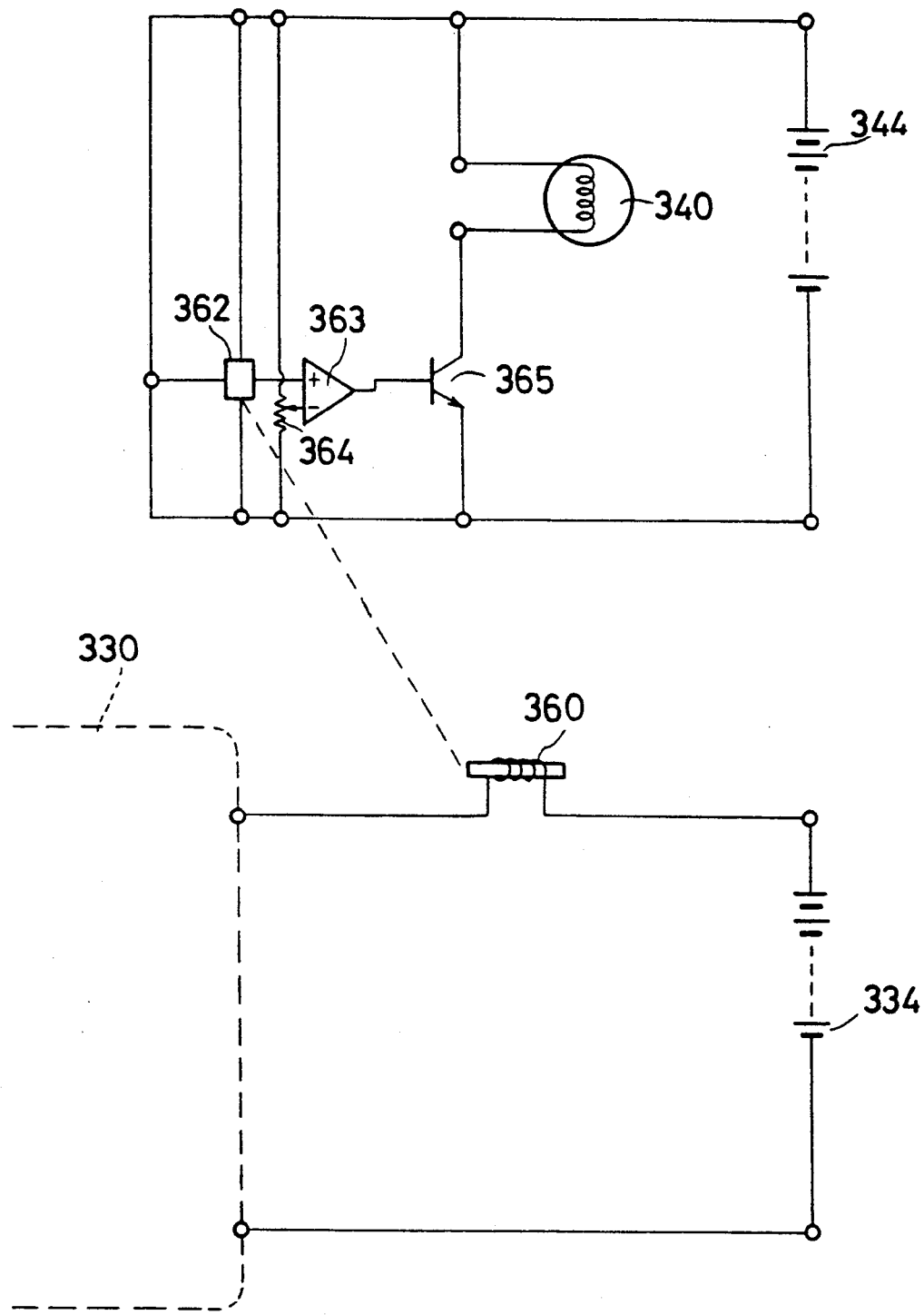
FIG. 13 is an electric circuit diagram employed in a modification of the sixth embodiment of a battery coupler according to the invention.

As illustrated above, in FIG. 12, the turn-on the halogen lamp 340 is controlled by means of the relay switch means. Alternatively, as shown in FIG. 13, the turn on/off of the halogen lamp 340 can be controlled by detecting a current flowing through the camera main body 330 by means of a Hall element 362, and operation amplifier 363, and a transistor 365. In this case, at first, if a current is flowed into the camera main body 330, a magnetic force from an electromagnet 360 acts on the Hall element 362 so that a current is caused to flow from the Hall element 362 to the operation amplifier 363. Also, another current is flowing in the operation amplifier through a resistor 364. A current value has been previously set in the operation amplifier 363. That is, if a difference between the current flowing from the Hall element 362 and the current flowing through the resistor 364 exceeds the previously set current value, then a current is caused to flow from the operation amplifier 356 to the transistor 365 and also a current is flowed from the video light battery 344 to the halogen lamp 340, thereby turning on the halogen lamp 340.

Therefore, if the resistor 364 is arranged such that the value thereof can be adjusted from externally, then the volume of the resistor 364 that is suitable for the camera main body can be set properly. For example, when a current flowing in the camera main body 330 is 920 mA in recording (REC) and 800 mA in stand-by for recording, the turn-on time of the halogen lamp 340 can be sent by adjusting the volume of the resistor 364 to thereby select either of the (REC) or (STAND-BY) mode.

As described above, in the sixth embodiment of battery coupler according to the invention, the halogen lamp 340 is fixed to upper portion of the coupler 336. Alternatively, as shown in FIG. 14, according to a seventh embodiment of the invention, a halogen lamp 380 may be constructed as a pop-up lamp which can be stored within a coupler 382 when it is not in use.

When mounting the coupler 382 to the camera main body 330, if the mounting surface 382A of the coupler 382 is pressed against the mounting surface of the camera main body 330 to which the camera battery 334 is mounted and is then slided in a direction of an arrow A in FIG. 14, then the mounting portion (not shown) of the camera main body 330 is brought into engagement with engagement holes 383, 383, . . . . In this condition, a lock member is inserted into a lock hole 383A from the camera main body 330 side and the coupler 382 is then fixed to the camera main body 330. Then, the terminals 382B, 382B of the coupler 382 are connected to terminals (not shown) for the camera battery 334. Therefore, the coupler 382 can be mounted to the mounting surface of the camera battery 334 of the camera main body 330. By the way, in FIG. 14, numeral 384 designates a pop-up button and 386 stands for a light mode change-over switch.

Also, as shown in FIG. 15 as an eighth embodiment of the invention, a halogen lamp 390 is disconnected from a coupler 392 and a knob 391 is rotated to thereby threadedly engage a screw 391A with the coupler 392, so that the halogen lamp 390 can be mounted to the coupler 392. In FIG. 15, numeral 394 designates a terminal and 396 stands for a mode change-over switch.

Figure 16:
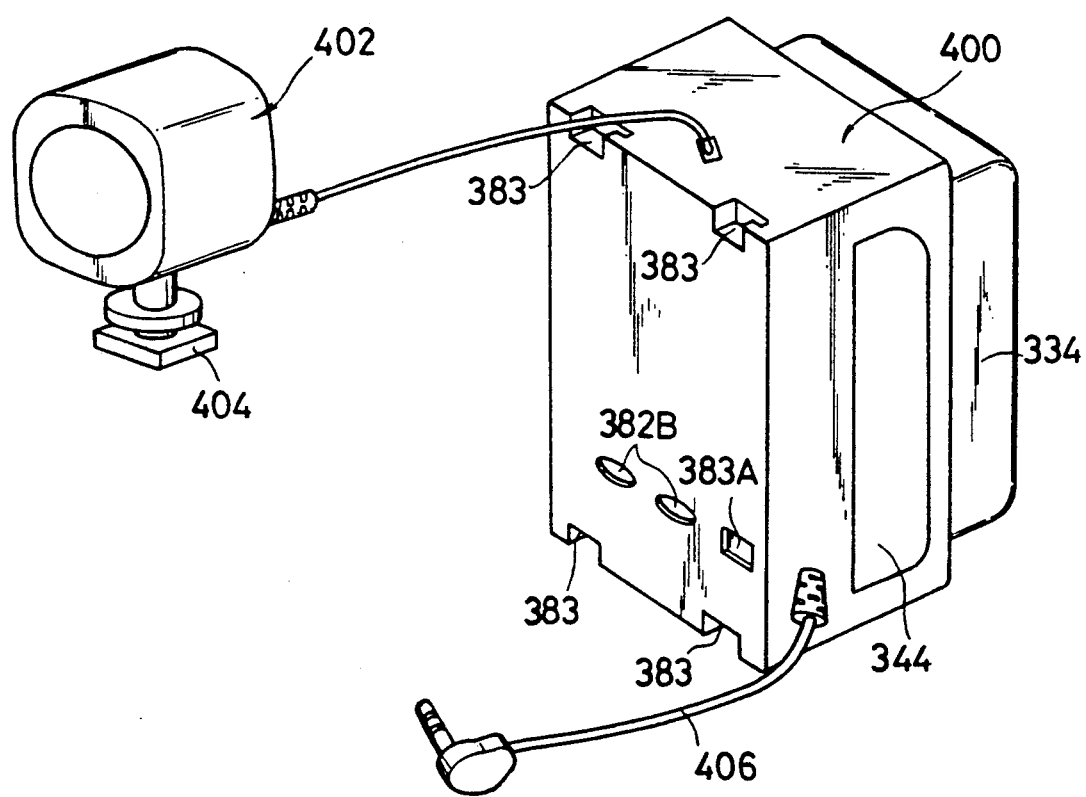
FIG. 16 is a perspective view of a ninth embodiment of a battery coupler according to the invention; and, FIG. 17 is a perspective view of a battery coupler according to the prior art.

As described above, in the sixth to eighth embodiments of the invention, the coupler is interposed between the camera main body 330 and the battery 334 and the halogen lamp is provided in the coupler. However, when the camera main body is equipped with a mounting shoe, the battery coupler may be constructed in such a manner as a ninth embodiment which is shown in FIG. 16. The ninth embodiment is mainly composed of a coupler 400 and a halogen lamp 402.

The coupler 400 is removably interposed between the camera main body and the battery 334 and a battery 344 for light is stored within the coupler 400. The halogen lamp 402 has a mounting plate 404 which can be mounted to a mounting shoe (not shown) of the camera main body. In other words, in the ninth embodiment, the coupler 400 and halogen lamp 402 are basically divided from each other. This divisional structure prevents worsening of weight balance when the halogen lamp 402 is installed onto the camera main body, and also allows mounting of the halogen lamp even when a mounting shoe is constructed such that only a light weight object such as an external microphone or the like can be mounted thereto.

Also, due to the fact that an electric circuit, for example, as shown in FIG. 12 or FIG. 13 is provided in the coupler 400, there is eliminated the need for provision of a connecting cord for controlling the turn-on of the halogen lamp.

Further, a connecting cord 406 can be connected to the camera main body 330 so that an electric signal from the camera main body can be received. And, this electric signal can be used to control the halogen lamp 402 such that it can provide a zoom light according focal distances.

In the above-mentioned embodiment, the halogen lamp is used as a video light. However, the invention is not always limited to this, but other illuminating members can be used.

Also, in the above-mentioned embodiments, the battery coupler according to the invention is mounted to the 8 mm video tape recorder. However, this is not limitative, but the battery coupler can also be mounted to other types of VTRs integral with a camera.

As has been described hereinbefore, a battery coupler according to the invention can provide several effects as follows:

①　Due to the fact that a shoe for mounting accessories is provided in the battery coupler, simply by interposing the battery coupler between a video tape recorder (VTR) integral with a camera and a battery for the camera, a battery coupler, a microphone, a box-type simple camera or the like can be mounted to the VTR integral with a camera.

For this reason, even in a VTR integral with a camera which does not include any accessory mounting shoe in its camera main body, a photographer can mount a battery coupler, a microphone, or a box-type simple camera to such VTR to thereby be able to take such an excellent picture or to record such an excellent sound as satisfies the photographer, and to enjoy either of moving or still picture according to cases.

②　Also, according to a battery coupler of the invention, with a battery coupler and a camera battery being integral with each other, the camera battery can be charged. Therefore, the battery charging operation can be simplified. Also, in a long photographing, similarly as in an ordinary VTR integral with a camera, the camera battery can be replaced sequentially. In a battery coupler according to the invention, spare batteries stored can be used to take successive pictures, which eliminates the need to carry a battery case besides the camera main body to be able to improve portability.

③　Further, according to a battery coupler of the invention, due to the fact that a battery portion for a video light can be removably interposed between a main body of a VTR integral with a camera and a battery used to operate the VTR integral with a camera, the VTR integral with a camera can be made compact and thus, even the battery capacity thereof is small, the battery coupler can be mounted to the VTR integral with a camera is improved to thereby be able to take a stable picture. Further, even when a mounting shoe is constructed such that it can mount only a light weight member such as an external microphone or the like, and even when no mounting shoe is provided in the main body of the VTR integral with a camera, the battery coupler can be easily mounted to the main body of the VTR integral with a camera.

In addition, because there is eliminated the need for provision of a connecting cord for controlling the turn-on of a video light, the whole VTR including the present battery coupler can be carried with more ease.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A battery coupler mountable to a battery mounting portion of a video tape recorder integral with a camera and allowing mounting of a camera battery thereto, said battery coupler comprising:
    a means for electrically connecting said camera battery with said video tape recorder integral with a camera; and,
    a shoe for mounting accessories.

2. A battery coupler as set forth in claim 1, wherein said accessory mounting shoe includes an electrical contact for electrically connecting one of said accessories with said shoe.

* * * * *